(12) United States Patent
Nummila-Pakarinen et al.

(10) Patent No.: US 10,144,789 B2
(45) Date of Patent: Dec. 4, 2018

(54) LOW DENSITY POLYETHYLENE FOR EXTRUSION COATING

(71) Applicant: BOREALIS AG, Vienna (AT)

(72) Inventors: Auli Nummila-Pakarinen, Porvoo (FI); Bernt-Ake Sultan, Stenungsund (SE); Bjorn Voigt, Hisings Backa (SE); Gabriel Ruess, Vienna (AT); Martin Anker, Hisings Karra (SE); Mattias Bergqvist, Goteborg (SE); Thomas Gkourmpis, Gothenburg (SE); Thomas Hjertberg, Kungshamn (SE)

(73) Assignee: BOREALIS AG, Vienna (AT)

( * ) Notice: Subject to any disclaimer, the term of this patent is extended or adjusted under 35 U.S.C. 154(b) by 817 days.

(21) Appl. No.: 14/403,972

(22) PCT Filed: Dec. 7, 2012

(86) PCT No.: PCT/EP2012/005072
§ 371 (c)(1),
(2) Date: Nov. 25, 2014

(87) PCT Pub. No.: WO2013/178242
PCT Pub. Date: Dec. 5, 2013

(65) Prior Publication Data
US 2015/0111053 A1 Apr. 23, 2015

(30) Foreign Application Priority Data
May 31, 2012 (EP) .................................... 12170203

(51) Int. Cl.
*B05D 1/40* (2006.01)
*B32B 27/32* (2006.01)
*C08F 110/02* (2006.01)
*C09D 123/06* (2006.01)

(52) U.S. Cl.
CPC .............. *C08F 110/02* (2013.01); *B05D 1/40* (2013.01); *C09D 123/06* (2013.01); *B05D 2507/015* (2013.01); *B32B 27/32* (2013.01); *C08F 2500/04* (2013.01); *C08F 2500/08* (2013.01); *Y10T 428/31938* (2015.04)

(58) Field of Classification Search
CPC ....... C08F 110/02; C08F 10/20; C08F 210/02
See application file for complete search history.

(56) References Cited

U.S. PATENT DOCUMENTS 6,521,734 B1 * 2/2003 Araki ............... B32B 27/32
526/227
2007/0225445 A1 9/2007 Nguyen et al.
2010/0317804 A1 12/2010 Karjala et al.
2013/0261265 A1 * 10/2013 Karjala ............. C08J 5/18
525/240

FOREIGN PATENT DOCUMENTS

| EP | 2123707 A1 | 11/2009 |
|---|---|---|
| EP | 2130863 A1 | 12/2009 |
| WO | 03066698 A1 | 8/2003 |
| WO | 2005002744 A1 | 1/2005 |
| WO | 2007045315 A1 | 4/2007 |
| WO | 2013078018 A2 | 5/2013 |
| WO | 2013178241 A1 | 12/2013 |
| WO | 2013178242 A1 | 12/2013 |

OTHER PUBLICATIONS

Raff et al., "Crystalline Olefin Polymers," Part II, 1964, pp. 478-484.
Rosato, "Coating", Plastics Processing Data Handbook, 1997, pp. 273-277.
Jackson et al., "Molecular Weight Sensitive Detectors," Handbook of Size Exclusion Chromatography and Related Techniques, C.-S. Wu, 2nd ed., 2004, pp. 99-104.
Heino et al., "Rheological Characterization of Polyethylene Fractions," Theor. Appl. Rheol., Proc. Int. Congr. Rheol, 11th Edition, No. 1, 1992, pp. 360-362.
Kaye et al., "Definition of Terms Relating to the Non-Ultimate Mechanical Properties of Polymers," Pure & Appl. Chem., vol. 70, No. 3, 1998, pp. 701-754.
Heino, "The Influence of Molecular Structure on Some Rheological Properties of Polyethylene," Annual Transactions of the Nordic Rheology Society, vol. 3, 1995.
He et al., "Unexpected proton spin-lattice relaxation in the solutions of polyolefin and tetrachloroethane", Mag. Res. Chem., 2010, 48, pp. 537-542.
Busico et al., "H NMR Analysis of Chain Unsaturations in Ethene/1-Octene Copolymers Prepared with Metallocene Catalysts at High Temperature", Macromolecules, vol. 38, No. 16, 2005, pp. 6988-6996.

(Continued)

Primary Examiner — Ramsey Zacharia
(74) Attorney, Agent, or Firm — Roberts Mlotkowski Safran Cole & Calderon, P.C.

(57) ABSTRACT

The present invention relates to a low density polyethylene having a molecular weight distribution Mw/Mn which is 15 or less, a storage modulus G', measured at a loss modulus G" of 5 kPa, which is above 3000 Pa, a weight average molecular weight (Mw) which is between 192000 and 250000 g/mol and has a melt flow rate (MFR) according to ISO 1133 (190° C., 2.16 kg) which is higher than 3.0 g/10 min, compositions, a process for production of the low density polyethylene, a low density polyethylene which is obtainable by the process, a continuous ethylene polymerization method for introducing vinylidene in a low density polyethylene, a method for an extrusion coating process or a method for an extrusion lamination process, an article, e.g. an extrusion article, an extrusion lamination article, film blowing article, film casting article, wire and cable extrusion article, injection molding article, blow molding article or pipe extrusion article, and uses of the low density polyethylene.

13 Claims, 4 Drawing Sheets

(56) References Cited

OTHER PUBLICATIONS

International Search Report of International Application No. PCT/EP2012/005072 dated Jul. 12, 2012.
Otto J. Berbee, et al.; U.S. Appl. No. 61/563,186, filed Nov. 23, 2011.
Choon K. Chai, et al.; "Rheological Study of Melt Elasticity on Extrusion Coating with Polyethylenes"; TAPPI 9th European Place Conference; Rome, Italy; May 12-14, 2003.
Per-Ake Clevenhag, et al.; "G prime—a Reheological Indicator to Predict the Extrusion Coating Performance of LDPE"; TAPPI 9th European PLACE Conference; Rome, Italy; May 12-14, 2003.
Claes Oveby, et al.; "Reheological Parameters to Predict the Extrusion Coating Performance of LDPE"; Annual Transactions of the Nordic Rheology Society; vol. 5; pp. 70-72; (1997).
Encyclopedia of Polymer Science LDPE; vol. 2; Wiley Interscience; pp. 412-441; (2002).
Notice of Opposition issued in European Patent No. 2855538, filed on May 9, 2018.
Declaration of Dr. Teresa Plumley Karjala and Dr. Jaap den Doelder on WO2013/078018; submitted with Notice of Opposition issued in European Patent No. 2855538, filed on May 9, 2018.
International Standard; "Plastics—Determination of average molecular mass and molecular mass distribution of polymers using size-exclusion chromatography—Part 4: High temperature method"; ISO 16014-4:2003(E); submitted with Notice of Opposition issued in European Patent No. 2855538, filed on May 9, 2018.
The Dow Chemical Company; Invoice No. 26905156, dated May 13, 2007; submitted with Notice of Opposition issued in European Patent No. 2855538, filed on May 9, 2018.
The Dow Chemical Company; Certificate of Analysis, Certificate No. 3478281, dated May 13, 2007; submitted with Notice of Opposition issued in European Patent No. 2855538, filed on May 9, 2018.
The Dow Chemical Company; Invoice No. 26905157, dated May 13, 2007; submitted with Notice of Opposition issued in European Patent No. 2855538, filed on May 9, 2018.
The Dow Chemical Company; Certificate of Analysis, Certificate No. 3478284, dated May 13, 2007; submitted with Notice of Opposition issued in European Patent No. 2855538, filed on May 9, 2018.
The Dow Chemical Company; Invoice No. 26906739, dated May 14, 2007; submitted with Notice of Opposition issued in European Patent No. 2855538, filed on May 9, 2018.
The Dow Chemical Company; Certificate of Analysis, Certificate No. 3480224, dated May 14, 2007; submitted with Notice of Opposition issued in European Patent No. 2855538, filed on May 9, 2018.
Declaration of Dr. Teresa Plumley Karjala on DOW LDPE 751A; submitted with Notice of Opposition issued in European Patent No. 2855538, filed on May 9, 2018.
Technical Data Sheet on DOW Polyethylene 751A; submitted with Notice of Opposition issued in European Patent No. 2855538, filed on May 9, 2018.

* cited by examiner

LOW DENSITY POLYETHYLENE FOR EXTRUSION COATING

FIELD OF THE INVENTION

The present invention relates to a new low density polyethylene, compositions, a process for production of the low density polyethylene, a low density polyethylene which is obtainable by the process, a continuous ethylene polymerization method for introducing vinylidene in a low density polyethylene, a method for an extrusion coating process or an extrusion lamination process, an article, e.g. an extrusion article, an extrusion lamination article, film blowing article, film casting article, wire and cable extrusion article, injection moulding article, blow moulding article or pipe extrusion article and, use in extrusion coating, extrusion lamination, film blowing, film casting, wire and cable extrusion, injection moulding, blow moulding or pipe extrusion.

BACKGROUND OF THE INVENTION

Low density polyethylene (LDPE), i.e. a polyethylene with a density range of 910-940 kg/m$^3$, is an important thermoplastic polymer and is of practical use in many industrial applications. Conventional low density polyethylene is produced by a high pressure process at a high temperature via free radical polymerization. Autoclave and tubular reactors are the two types of high pressure reactors which are predominantly used for producing low density polyethylene.

Further, in extrusion coating a thin film of polymer melt is extruded through a flat die and pressed onto a moving substrate. Extrusion coating is discussed, among others, in Vieweg, Schley and Schwarz: Kunststoff Handbuch, Band IV, Polyolefine, Carl Hanser Verlag (1969), pages 412 to 420. The substrate may be, among others, paper, paperboard, a plastic film or a metal film. The line speed in modern equipment can often be above 300 m/min or above 350 m/min.

Higher line speed sets heavy requirements for the material. Especially draw resonance is a problem often encountered with linear polymers, such as linear low density polyethylene (LLDPE), high density polyethylene (HDPE) or polypropylene (PP). At the onset of draw resonance large oscillations occur in the flow of the polymer melt through the die. Consequently, the coating becomes uneven. The draw resonance is due to the "tension thinning" behaviour of the linear polymers, where the elongational viscosity decreases with increasing tensile strain rate. On the other hand, highly branched polymers like low density polyethylene exhibit strain hardening, where the elongational viscosity increases with increasing tensile strain rate.

The two most important variables defining the processability of a polymer used for extrusion coating is its draw-down (DD) and neck-in (NI). The value of draw-down should be as high as possible in order to obtain as thin as possible coating layer and to allow a high production speed. At the same time it is desirable to have polymers with a low neck-in value. This first of all leads to a broader covering of the substrate, but also to less needs to trim away the outer part of the coated substrate. The latter is related to a phenomenon giving thicker edges of the melt film, "edge-bead". With increasing neck-in this thickening will increase and a larger part of the polymer and substrate must be trimmed away. Further web stability at high line speeds is critical for obtaining extrusion coated surfaces with even coating weight.

Traditionally, the autoclave materials, here low density polyethylenes produced in a stirred autoclave reactor, have superior processability for extrusion coating together with satisfactory end product properties. The autoclave materials exhibit a pronounced high molecular weight tail and have a good neck-in draw down balance. Tubular materials, here low density polyethylenes produced in a tubular reactor, have hitherto, due to plug flow in the reactor, not shown such a pronounced high molecular weight tail, which is usually found in materials produced in autoclave reactors. Thus, the tubular materials have hitherto not shown a good neck-in draw down balance. Especially the neck-in will be high with a tubular material and web stability will also be lower. In order to have a advantageous neck-in draw down balance and a web stability at high line speeds, the tubular material must have a high storage modulus G', measured at a loss modulus G" of 5 kPa.

Further, since autoclave plants are getting older, and there are not many new autoclave reactors being built in the world there is a need for alternative technology giving same processability. However, as described above, traditionally produced tubular LDPE polymers have not fulfilled the requirements set for processability. Thus, there is a need for new polymer structures from tubular reactor with advantageous properties to meet the requirements of draw-down and neck-in and web stability.

DESCRIPTION OF THE INVENTION

The present invention relates to a low density polyethylene having a molecular weight distribution Mw/Mn which is 15 or less, a storage modulus G', measured at a loss modulus G" of 5 kPa, which is above 3000 Pa, a weight average molecular weight (Mw) which is between 192000 and 250000 g/mol, and has a melt flow rate (MFR) according to ISO 1133 (190° C., 2.16 kg) which is higher than 3.0 g/10 min.

The low density polyethylene of the present invention is produced in a tubular reactor by radical initiated polymerization, where the polymerization is performed by reacting a reaction mixture, comprising ethylene monomers, under action of one or more radical initiators, such as peroxides, oxygen or combinations thereof, and wherein the inlet temperature of the reaction mixture into the first reaction zone of the reactor is from 125 to 132° C. By selecting the inlet temperature of the reaction mixture into the first reaction zone of the reactor in the polymerization we have surprisingly been able to produce a low density polyethylene showing advantageous properties.

The reaction mixture, which is compressed, comprises ethylene monomers and, optionally, chain transfer agents and/or, optionally, other processing aids.

The inlet temperature is the temperature of the reaction mixture at the moment when it enters into the first reaction zone of the reactor.

The first reaction zone is defined as the part of the reactor reaching from the position in the reactor, where the reaction mixture first comes in contact with the initiator mixture at the first intiator mixture inlet, to the position in the reactor of the second initiator mixture inlet.

Methods to determine the temperature of a reaction mixture in a tubular reactor are known in the art. Usually the temperature of a reaction mixture is measured inside the vessel, which contains the reaction mixture, at a distance to the walls of the vessels of 2 cm or more. A probe, such as a thermocouple, may be used to measure the temperature. In the case where the vessel is a circular object, such as a tube, the temperature is usually measured inside the vessel at a distance from the walls of the vessel of at least 1/10 of the inner diameter of the vessel. As will be readily appreciated, the maximum distance to the walls of a circular vessel is 1/2 of the inner diameter of the vessel. Preferably, the maximum distance to the walls of a circular vessel, where the temperature should be measured, should be 1/3, or less, of the inner diameter of the vessel.

By selecting the inlet temperature into the first reaction zone of the reactor we have surprisingly been able to produce a low density polyethylene showing advantageous properties. For example, the low density polyethylene of the present invention has unexpectedly a very high weight average molecular weight (Mw) and, simultaneously, a high melt flow rate (MFR). Thus, the weight average molecular weight (Mw) of the low density polyethylene of the present invention is very high in comparison with commercially available low density polyethylenes which have a similar melt flow rate (MFR) and are produced in tubular reactors, see Table 7 and FIG. 4.

Moreover, the storage modulus G', measured at a loss modulus G" of 5 kPa, has also shown to be generally higher for the low density polyethylene of the present invention than standard tubular materials (low density polyethylenes) produced with conventional techniques. As stated above in the background, a tubular material must have a high storage modulus G', measured at a loss modulus G" of 5 kPa, in order to have a advantageous neck-in draw down balance and a web stability at high line speeds.

The new low density polyethylene of the present invention exhibits advantageous processability properties, e.g. improved extrusion coating properties and/or improved extrusion lamination properties, compared to a regular tubular material. Further, the low density polyethylene of the present invention may be comprised in materials useful as melt strength modifier. Linear polyethylenes without long chain branches have for some applications insufficient melt strength, highly branched LDPE are then usually added to increase the melt strength. Traditionally autoclave materials are used but the new low density polyethylene of the present invention, from a tubular reactor origin, can surprisingly also be used as melt strength modifier.

The low density polyethylene of the present invention is a polyethylene having a density in the interval of 910-940 kg/m³, e.g. in the interval of 910-935 kg/m³.

Further, the low density polyethylene of the present invention is also a polyethylene having a density in the interval of 900-935 kg/m³, e.g. in the interval of 910-935 kg/m³.

Further, the low density polyethylene of the present invention has a molecular weight distribution Mw/Mn which is 15 or less.

Mn is the number average molecular weight and Mw is the weight average molecular weight. Mw and Mn are determined according to methods known in the art of Gel Permeation Chromatography (GPC). For branched materials the average molecular weight is determined by the aid of light scattering since the branched structure do not elute according to molecular weight as for linear materials.

The molecular weight distribution (Mw/Mn), which is also called MWD or PDI (polydispersity index), is a key parameter for extrusion coating properties and extrusion lamination properties. For the neck-in it is required a high molecular weight material with a slow relaxation in the gap of the extrusion coating equipment but for high throughput in extruder and for high drawdown speed a low molecular weight part must be present.

The low density polyethylene of the present invention, which is produced at low inlet temperature, has a very high molecular weight (Mw). The Mn must not be too low (i.e. not below 10000 for a material with Mw 150000-250000) since it then will contain a very large amount of low molecular weight material. This low molecular weight material will cause increased levels of smoke during extrusion and also increased levels of hexane extractables in the finished article. This is shown by the higher weight average molecular weight compared to materials produced with a higher inlet temperature (see Table 7). The increase in Mw seems to be much more dependent on the inlet temperature instead of, for instance, high peak temperatures (see Tables 2 to 6). The high molecular weight part of the matrix of the low density polyethylene has a significant amount of branches of significant length, thus allowing the entire system to sustain superior mechanical deformation. The level of long and short chain branching can be directly correlated with the density of the low density polyethylene, thus for systems of decreasing overall density the level of branching is increasing. The reasoning behind the mechanical deformation capabilities of such system is due to extensive level of entanglements present. Since the polymer chains of high molecular weight are expected to be relatively long and since the level of long chain branching is expected to be significant, we can assume that the high molecular weight chains will host the larger branches. Since these branches are also quite long a significant level of entanglement between fragments (segments) of the same or different chains will be present. These entanglements are known to induce increased mechanical deformation resistance in a polymer, and the longer and denser they are the more they increase the overall effect. The reasoning for such resistance has to do with the mobility of the polymer fragments located on either side of the entanglement point. As the deformation force is increased the system will undergo chain slippage across the entanglement point, chain disentanglement, chain re-entanglement and finally chain rapture. Obviously since the entanglement points are increased and the polymer fragment between two consecutive entanglement points is expected to be substantial (after all the branches are long and the molecular weight large) the eventual chain rupture will be delayed due to constant slippages, disentanglements and re-entanglements thus leading to an increase resistance to mechanical deformation. This effect is seen as an increased elasticity index G'(5 kPa). An increase in the value of this parameter correlates very well with the improvement of neck-in properties (see FIG. 1).

Autoclave materials, here low density polyethylenes produced in an stirred autoclave reactor, giving a pronounced high molecular weight tail (and very high Mw/Mn) have a good neck-in draw down balance. Tubular materials, here low density polyethylenes produced in a tubular reactor, will due to the plug flow in the reactor not have the pronounced high molecular weight tail usually found in materials produced in autoclave reactors and will not have good neck-in draw down balance. Especially neck-in will be high with a tubular material and web stability is also lower. In order to have a neck-in draw down balance and web stability at high line speeds the tubular material must have a higher molecular weight together with a high MFR. Also the Mw/Mn must not be too high when having a high Mw, this means that Mn must be increased when increasing Mw. If Mn is too low the material will contain a lot of low molecular weight material that can cause increased levels of smoke in the extrusion and increased levels of hexane extractables in the finished article. This has, according to the invention, surprisingly been achieved in polymerization in a tubular reactor by having a lower inlet temperature in the first reaction zone.

In a further embodiment the low density polyethylene of the present invention has a molecular weight distribution Mw/Mn which is 14.9 or less.

In still a further embodiment the molecular weight distribution Mw/Mn is 14.8 or less.

Still a further embodiment of the present invention provides a low density polyethylene wherein the molecular weight distribution Mw/Mn is 14.7 or less.

An even further embodiment of the present invention provides a low density polyethylene of the present invention wherein the molecular weight distribution Mw/Mn is 14.6 or less.

In still a further embodiment the molecular weight distribution Mw/Mn is 14.5 or less.

Further, suitable lower molecular weight distribution limits of molecular weight distribution intervals may be 8, 9, 10, 11, 12, 13, 14 or, alternatively 14.2, and these lower molecular weight distribution limits may each be used in any molecular weight distribution interval, open or closed, as described herein, i.e. used in combination with the given upper molecular weight distribution limit of any molecular weight distribution interval, as described herein.

Further, the low density polyethylene of the present invention has a storage modulus G', measured at a loss modulus G" of 5 kPa, which is above 3000 Pa.

In a further embodiment the low density polyethylene of the present invention has a storage modulus G', measured at a loss modulus G" of 5 kPa, which is above 3100 Pa.

In still a further embodiment the low density polyethylene of the present invention has a storage modulus G', measured at a loss modulus G" of 5 kPa, which is above 3200 Pa.

Still a further embodiment of the present invention provides a low density polyethylene which has a storage modulus G', measured at a loss modulus G" of 5 kPa, which is above 3300 Pa.

In a further embodiment the low density polyethylene of the present invention has a storage modulus G', measured at a loss modulus G" of 5 kPa, which is above 3400 Pa.

In an even further embodiment the low density polyethylene of the present invention has a storage modulus G', measured at a loss modulus G" of 5 kPa, which is above 3450 Pa.

In still a further embodiment the low density polyethylene of the present invention has a storage modulus G', measured at a loss modulus G" of 5 kPa, which is above 3500 Pa.

Further, suitable upper storage modulus G', measured at a loss modulus G" of 5 kPa, limits of storage modulus G', measured at a loss modulus G" of 5 kPa, intervals may be 3800, 3750, 3700, 3650, 3600 or, alternatively 3550 Pa, and these upper storage modulus G', measured at a loss modulus G" of 5 kPa, limits may each be used in any storage modulus G', measured at a loss modulus G' of 5 kPa, interval, open or closed, as described herein, i.e. used in combination with the given lower storage modulus G', measured at a loss modulus G" of 5 kPa, limit of any storage modulus G', measured at a loss modulus G" of 5 kPa, interval, as described herein.

Further, the low density polyethylene of the present invention has a weight average molecular weight (Mw) which is between 192000 and 250000 g/mol.

In a further embodiment the low density polyethylene of the present invention has a weight average molecular weight (Mw) which is between 195000 and 250000 g/mol.

In still a further embodiment the low density polyethylene of the present invention has a weight average molecular weight (Mw) which is between 198000 and 250000 g/mol.

In a further embodiment the low density polyethylene of the present invention has a weight average molecular weight (Mw) which is between 192000 and 245000 g/mol.

In still a further embodiment the low density polyethylene of the present invention has a weight average molecular weight (Mw) which is between 192000 and 240000 g/mol.

In a further embodiment the low density polyethylene of the present invention has a weight average molecular weight (Mw) which is between 200000 and 250000 g/mol.

In still a further embodiment the low density polyethylene of the present invention has a weight average molecular weight (Mw) which is between 200000 and 240000 g/mol.

Further, the low density polyethylene of the present invention has a melt flow rate (MFR) according to ISO 1133 (190° C., 2.16 kg) which is higher than 3.0 g/10 min.

In a further embodiment the low density polyethylene of the present invention has a melt flow rate (MFR) according to ISO 1133 (190° C., 2.16 kg) which is at least 3.5 g/10 min.

In still a further embodiment the low density polyethylene of the present invention has a melt flow rate (MFR) according to ISO 1133 (190° C., 2.16 kg) which is at least 4.0 g/10 min.

In an even further embodiment the low density polyethylene of the present invention has a melt flow rate (MFR) according to ISO 1133 (190° C., 2.16 kg) which is at least 4.2 g/10 min.

Still a further embodiment of the present invention provides a low density polyethylene which has a melt flow rate (MFR) according to ISO 1133 (190° C., 2.16 kg) which is at least 4.5 g/10 min.

In a further embodiment the low density polyethylene of the present invention has a melt flow rate (MFR) according to ISO 1133 (190° C., 2.16 kg) which is at least 5.0 g/10 min.

In an even further embodiment the low density polyethylene of the present invention has a melt flow rate (MFR) according to ISO 1133 (190° C., 2.16 kg) which is at least 5.2 g/10 min.

In still a further embodiment the low density polyethylene of the present invention has a melt flow rate (MFR) according to ISO 1133 (190° C., 2.16 kg) which is at least 5.4 g/10 min.

In an even further embodiment the low density polyethylene of the present invention has a melt flow rate (MFR) according to ISO 1133 (190° C., 2.16 kg) which is at least 5.5 g/10 min.

In still a further embodiment the low density polyethylene of the present invention has a melt flow rate (MFR) according to ISO 1133 (190° C., 2.16 kg) which is at least 5.6 g/10 min.

In an even further embodiment the low density polyethylene of the present invention has a melt flow rate (MFR) according to ISO 1133 (190° C., 2.16 kg) which is at least 5.7 g/10 min.

A further embodiment of the present invention provides a low density polyethylene, as described herein, wherein the low density polyethylene is a homopolymer of ethylene.

Still a further embodiment of the present invention provides a low density polyethylene, as described herein, wherein the low density polyethylene has a density in the interval of 900-935 kg/m$^3$, e.g. in the interval of 910-935 kg/m$^3$.

A further embodiment of the present invention provides a low density polyethylene, as described herein, wherein the low density polyethylene is produced in a tubular reactor.

A low density polyethylene which is produced in a tubular reactor has traditionally a molecular weight distribution without the pronounced high molecular weight tail present in autoclave materials. This difference in the appearance of the molecular weight distribution is expected and detectable to a person skilled in the art.

Further, the low density polyethylene of the present invention has a vinylidene content which is at least 15/100 k C, where 15/100 kC means 15 vinylidene groups per 100000 carbons.

Vinylidene is formed by beta-scission of tertiary carbon radicals. With increased branching by higher radical initiator amount, the number of tertiary carbon radicals will increase and also the probability of beta-scission and creation of a vinylidene. The vinylidene content will then be an indirect measurement on the amount of introduced branches in the low density polyethylene of the present invention.

The branching originates from radical transfer to the polymer backbone. These transfer reactions are necessary for differentiation of the molecular weights between the chains, propagation leading to long-chain branching or termination via combination leading to two chains is merged into one. The introduction of long chain branching and high molecular weight material, make the material, here the low density polyethylene of the present invention, exhibiting entanglements in the melt which leads to higher melt elasticity (reduced neck-in).

In a further embodiment the low density polyethylene of the present invention has a vinylidene content which is at least 17/100 k C.

In still a further embodiment the vinylidene content is at least 19/100 k C.

Still a further embodiment of the present invention provides a low density polyethylene wherein the vinylidene content is at least 20/100 k C.

In a further embodiment of the present invention a low density polyethylene is provided wherein the vinylidene content is at least 22/100 k C.

An even further embodiment of the present invention provides a low density polyethylene wherein the vinylidene content is at least 24/100 k C.

In a further embodiment the low density polyethylene of the present invention has a vinylidene content which is at least 25/100 k C.

Further, suitable upper vinylidene content limits of vinylidene content intervals may be 38, 36, 34, 32, 30, 28 or, alternatively 26, and these upper vinylidene content limits may each be used in any vinylidene content interval, open or closed, as described herein, i.e. used in combination with the given lower vinylidene content limit of any vinylidene content interval, as described herein.

The present invention also relates to compositions comprising the low density polyethylene, which compositions may be useful in extrusion coating and/or extrusion lamination. There are commercially available polypropylene, linear low density and high density polyethylene grades for extrusion coating where improved processability is achieved by modifying them with autoclave LDPE. A tubular LDPE with suitable melt elasticity can be used for same purpose.

In a further aspect, the present invention relates to a composition comprising the new low density polyethylene, which composition may be useful in extrusion coating processes and/or extrusion lamination processes.

Accordingly, the present invention provides a composition, useful in extrusion coating processes and/or extrusion lamination processes, which composition comprises the low density polyethylene of the present invention, and, optionally, additionally further components, e.g. olefin polymers such as polyethylene or polypropylene, for example, linear homopolymers of ethylene and/or copolymers of ethylene and one or more alpha-olefin comonomers having from 3 to 20 carbon atoms. Homo- and copolymers of ethylene, homo- and copolymers of propylene and homo- and copolymers of 1-butene are also examples of further components. Said olefin polymers may be produced by polymerising olefins in the presence of transition metal polymerisation catalysts. Further components include, e.g., bimodal copolymers of ethylene and at least two alpha-olefin comonomers, like those disclosed in WO 2005/002744 and WO 03/66698.

Furthermore, examples of such further components may be, e.g., olefin polymers such as homo- and copolymers of ethylene, homo- and copolymers of propylene and homo- and copolymers of 1-butene.

Furthermore, the composition of the present invention may further comprise antioxidants, stabilizers, other additives and fillers, which are all known in the art.

The composition of the present invention, useful in extrusion coating processes and/or extrusion lamination processes, may include the new low density polyethylene in an amount of from 5 to 40% by weight, based on the total weight of the composition. In a further embodiments the composition may comprise from 10 to 35% by weight, or alternatively from 20 to 35% by weight, of the new low density polyethylene. Furthermore, in addition to the new low density polyethylene, the composition may further comprise of from 60 to 95% by weight, for example, from 65 to 90%, and e.g. from 65 to 80% of at least one further component selected from a linear ethylene homopolymer, and a copolymer of ethylene with one or more alpha-olefin comonomers having from 3 to 20 carbon atoms.

Still a further embodiment of the invention provides a composition as described herein, which may comprise the low density polyethylene in an amount of 5 to 40 wt %, based on the total weight of the composition, and which composition may further comprise at least one olefin polymer prepared in the presence of a transition metal catalyst, which at least one olefin polymer may be selected from homo- or copolymers of polyethylene, polypropylene or poly-1-butene.

A further embodiment of the invention provides a composition comprising
the low density polyethylene of the present invention, and
at least one olefin polymer prepared in the presence of a transition metal catalyst, wherein the olefin polymer may be selected from homo- or copolymers of polyethylene, polypropylene or poly-1-butene, and the low density polyethylene may be present in an amount of 5 to 40 wt %, based on the total weight of the composition.

In line with the present invention, the composition can be processed in an extrusion coating line with a high line speed and minimum risk of draw resonance.

The compositions of the present invention can be extrusion coated to different substrates at high line speeds and the compositions may have a reduced tendency to undergo draw resonance and an even distribution of the coating may be obtained. This would allow a high throughput in the coating line with a maintained good product quality. Thus, the low density polyethylene according to the present invention can be used to make compositions which may exhibit an excellent processability. On the other hand, any advantageous properties of any other composition components present in the composition may be maintained. Therefore, the low density polyethylene according to present invention can be used to improve the processability, and lowered levels of smoke during processing and hexane extractables, of different compositions having various advantageous properties, such as good optical properties, good sealing properties and good abrasion resistance. Further still, the compositions of the present invention may have a low neck-in and excellent processability at high line speeds (meaning high draw-down and web stability) when used in extrusion coating. In particular, the neck-in decreases when the line speed increases, which results in better coating performance at higher throughput. A low neck-in leads to a low amount of wasted substrate material, as the uncoated part of the substrate needs to be cut off and discarded. The substrate to be coated can be any substrate known in the art, such as paper, paperboard, Kraft paper, metal foil, plastic foil and cellophane foil. To improve the adhesion between the substrate and a the coating polymer layer the methods commonly known in the art may be used, such as ozone treatment of the molten polymer film, flame treatment and corona treatment of the substrate, an adhesive layer may be used, and an adhesion promoter may be used.

A further object of the invention is a process for production of a low density polyethylene, of the present invention, in a tubular reactor by radical initiated polymerization under high pressure, wherein the polymerization is performed by reacting a reaction mixture, comprising ethylene monomers, under action of one or more radical initiators, such as peroxides, oxygen or combinations thereof, and wherein the inlet temperature of the reaction mixture into the first reaction zone of the reactor is from 125 to 132° C.

Still a further object of the invention is a process for production of a low density polyethylene, of the present invention, in a tubular reactor by radical initiated polymerization under high pressure, which pressure is from 1000 to 3000 bar, e.g. from 1500 to 2500 bar, wherein the polymerization is performed by reacting a reaction mixture, comprising ethylene monomers, under action of one or more radical initiators, such as peroxides, oxygen or combinations thereof, and wherein the inlet temperature of the reaction mixture into the first reaction zone of the reactor is from 125 to 132° C.

The reaction mixture and inlet temperature are, both, as defined herein.

By selecting the inlet temperature into the first reaction zone of the reactor to be from 125 to 132° C., we have surprisingly been able to produce a low density polyethylene exhibiting advantageous properties.

According to embodiments of the present invention "the inlet temperature into the reactor" means the inlet temperature into the first reaction zone of the reactor.

Still a further object of the invention includes a process for production of the low density polyethylene, as described herein, where the inlet temperature into the first reaction zone of the reactor is from 125 to 131° C.

An even further object of the invention includes a process for production of the low density polyethylene, as described herein, where the inlet temperature into the first reaction zone of the reactor is from 125 to 130° C.

In a further embodiment of the present invention, the invention includes a process for production of the low density polyethylene, as described herein, where the inlet temperature into the first reaction zone of the reactor is from 126 to 132° C., or, alternatively, from 126 to 131° C.

An embodiment of the present invention provides a process for production of the low density polyethylene, as described herein, where the inlet temperature into the first reaction zone of the reactor is from 127 to 132° C., or, alternatively, from 127 to 131° C.

A further object of the invention is a process for production of a low density polyethylene, of the present invention, in a tubular reactor by radical initiated polymerization under high pressure, wherein the polymerization is performed by reacting the reaction mixture, comprising ethylene monomers, under the action of one or more radical initiators, such as peroxides, oxygen or combinations thereof, wherein the inlet temperature into the first reaction zone of the reactor is selected, as described in any of the embodiments described herein. By selecting the inlet temperature into the first reaction zone of the reactor we have surprisingly been able to produce a low density polyethylene exhibiting advantageous properties.

Still a further object of the invention is a process for production of a low density polyethylene, of the present invention, in a tubular reactor by radical initiated polymerization under high pressure, which pressure is from 1000 to 3000 bar, e.g. from 1500 to 2500 bar, wherein the polymerization is performed by reacting the reaction mixture, comprising ethylene monomers, under the action of one or more radical initiators, such as peroxides, oxygen or combinations thereof, wherein the inlet temperature into the first reaction zone of the reactor is selected, as described in any of the embodiments described herein. By selecting the inlet temperature into the first reaction zone of the reactor we have surprisingly been able to produce a low density polyethylene exhibiting advantageous properties.

Still a further object of the invention includes a process for production of the low density polyethylene, of the present invention, in a tubular reactor under high pressure by radical initiated polymerization where the polymerization is performed by reacting the reaction mixture, comprising ethylene monomers, under the action of one or more radical initiators, such as peroxides, oxygen or combinations thereof, preferably under the action of one or more peroxides, comprising low temperature decomposition peroxides, e.g., peroxides having a 0.1 hour half-life temperature which is below 100° C., wherein the inlet temperature into the first reaction zone of the reactor is selected, as described in any of the embodiments described herein.

Still even a further object of the invention includes a process for production of the low density polyethylene, of the present invention, in a tubular reactor under high pressure, which pressure is from 1000 to 3000 bar, e.g. from 1500 to 2500 bar, by radical initiated polymerization where the polymerization is performed by reacting the reaction mixture, comprising ethylene monomers, under the action of one or more radical initiators, such as peroxides, oxygen or combinations thereof, preferably under the action of one or more peroxides, comprising low temperature decomposition peroxides, e.g., peroxides having a 0.1 hour half-life temperature which is below 100° C., wherein the inlet temperature into the first reaction zone of the reactor is selected, as described in any of the embodiments described herein.

An even further object of the invention includes a process for production of the low density polyethylene, of the present invention, in a tubular reactor under high pressure by radical initiated polymerization where the polymerization is performed by reacting the reaction mixture, comprising ethylene monomers, under the action of one or more radical initiators, being peroxides, comprising low temperature decomposition peroxides, e.g., peroxides having a 0.1 hour half-life temperature which is below 100° C., wherein the inlet temperature into the first reaction zone of the reactor is selected, as described in any of the embodiments described herein.

Still an even further object of the invention includes a process for production of the low density polyethylene, of the present invention, in a tubular reactor under high pressure, which pressure is from 1000 to 3000 bar, e.g. from 1500 to 2500 bar, by radical initiated polymerization where the polymerization is performed by reacting the reaction mixture, comprising ethylene monomers, under the action of one or more radical initiators, being peroxides, comprising low temperature decomposition peroxides, e.g., peroxides having a 0.1 hour half-life temperature which is below 100° C., wherein the inlet temperature into the first reaction zone of the reactor is selected, as described in any of the embodiments described herein.

The present invention do also relate to a continuous ethylene polymerization method for introducing a high vinylidene content in a low density polyethylene, wherein vinylidene is introduced by reacting a reaction mixture, comprising ethylene monomers, under the action of one or more radical initiators, such as peroxides, oxygen or combinations thereof, and by selecting the inlet temperature of the reaction mixture into the first reaction zone of the reactor to be from 125 to 132° C.

Further, a continuous ethylene polymerization method for introducing a vinylidene in a low density polyethylene is disclosed, wherein vinylidene is introduced by selecting an inlet temperature of the reaction mixture into the first reaction zone of the reactor which is from 125 to 132° C.

Furthermore, the present invention do also relate to a continuous ethylene polymerization method for introducing a high vinylidene content in a low density polyethylene, wherein vinylidene is introduced by selecting the inlet temperature of the reaction mixture into the first reaction zone of the reactor to be from 125 to 132° C. Further, the continuous ethylene polymerization, for introducing a high vinylidene content in a low density polyethylene, is a radical initiated polymerization where the polymerization is performed by reacting the reaction mixture, comprising ethylene monomers, under the action of one or more radical initiators, such as peroxides, oxygen or combinations thereof, preferably under the action of one or more peroxides, comprising low temperature decomposition peroxides, e.g., peroxides having a 0.1 hour half-life temperature which is below 100° C.

Still a further object of the invention includes a continuous ethylene polymerization method for introducing a high vinylidene content in a low density polyethylene, as described herein, where the inlet temperature of the reaction mixture into the first reaction zone of the reactor is from 125 to 131° C.

An even further object of the invention includes a continuous ethylene polymerization method for introducing a high vinylidene content in a low density polyethylene, as described herein, where the inlet temperature of the reaction mixture into the first reaction zone of the reactor is from 125 to 130° C.

In a further embodiment of the present invention, the invention includes a continuous ethylene polymerization method for introducing a high vinylidene content in a low density polyethylene, as described herein, where the inlet temperature of the reaction mixture into the first reaction zone of the reactor is from 126 to 132° C., or, alternatively, from 126 to 131° C.

An embodiment of the present invention provides a continuous ethylene polymerization method for introducing a high vinylidene content in a low density polyethylene, as described herein, where the inlet temperature of the reaction mixture into the first reaction zone of the reactor is from 127 to 132° C., or, alternatively, from 127 to 131° C.

A further embodiment discloses the continuous ethylene polymerization method for introducing high vinylidene content in a low density polyethylene, the ethylene polymerization is a radical initiated polymerization and the polymerization is performed by reacting the reaction mixture, comprising ethylene monomers, under the action of one or more radical initiators, such as peroxides, oxygen or combinations thereof, preferably under the action of one or more peroxides, comprising low temperature decomposition peroxides, e.g., peroxides having a 0.1 hour half-life temperature which is below 100° C., wherein the inlet temperature into the first reaction zone of the reactor is selected, as described in any of the embodiments described herein.

Further embodiments disclose a process for production of the low density polyethylene, as described herein, or a continuous ethylene polymerization method, as described herein, wherein the inlet temperature into the first reaction zone of the reactor is selected, as described in any of the embodiments described herein, and a radical initiator cocktail is used, which is composed of the following radical initiators, where the 0.1 hours half life temperature (T½) is given for each radical initiator: Initiator A (T½ 0.1 h at 75-90° C. in chlorobenzene), Initiator B (T½ 0.1 h at 80-95° C. in chlorobenzene), Initiator C (T½ 0.1 h at 105-125° C. in chlorobenzene), Initiator D (T½ 0.1 h at 125-140° C. in chlorobenzene) Initiator E (T½ 0.1 h at 130-145° C. in chlorobenzene) and Initiator F (T½ 0.1 h at 155-175° C. in chlorobenzene).

A further embodiment discloses a low density polyethylene which is obtainable by the process of the present invention as described herein.

Another object of the invention relates to a method for an extrusion coating process, which method comprises extrusion coating a flat substrate by extruding the low density polyethylene of the invention, or the composition of the invention, in a molten state through a flat die onto said substrate, or a method for an extrusion lamination process utilizing the low density polyethylene of the invention, or the composition of the invention.

In an extrusion coating process a substrate is coated with polymer. For the sake of completeness it is stated here that extrusion lamination processes also are included in accordance with the invention and any modification for such a process will be clear to a person skilled in the art. The substrate is typically a fibrous substrate, such as paper, paperboard or Kraft paper or woven or non-woven fabrics; a metal foil, such as aluminum foil; or a plastic film, such as a biaxially oriented polypropylene film, PET film, PA film or cellophane film. Further substrates may also include less flexible substrates, such as substrates comprising thick metal or wood. The polymer is extruded onto the moving substrate through a flat die. The polymer melt exits the die typically at a high temperature, typically between 275 to 330° C. After exiting the die the polymer melt is oxidized when it comes into contact with air. The oxidation improves the adhesion between the coating and the substrate.

When the melt exits the die the melt film is pulled down into a nip between two rollers, the pressure roll and the chill roll, situated below the die. The substrate, moving at a velocity which is higher than that of the melt film, draws the film to the required thickness. The pressure between the two rolls forces the film onto the substrate. Further, the film is cooled and solidified by the low temperature of the chill roll.

The draw-down ratio, which is one of the characteristic parameters of the extrusion coating process, is the ratio of the die gap to the thickness of the polymer film on the substrate.

Description of extrusion coating process is given, for instance, in Crystalline Olefin Polymers, Part II, by R. A. V. Raff and K. W. Doak (Interscience Publishers, 1964), pages 478 to 484, or Plastics Processing Data Handbook, by Dominick V. Rosato (Chapman & Hall, 1997), pages 273 to 277.

An embodiment of the present invention discloses an article, e.g. an extrusion article, for example, an extrusion coating article or an extrusion lamination article, film blowing article, film casting article, wire and cable extrusion article, injection moulding article, blow moulding article or pipe extrusion article, comprising the low density polyethylene of the present invention, or the composition of the present invention.

According to the invention an extrusion coating article or an extrusion lamination article is disclosed which comprises the low density polyethylene of the invention, or the composition of the invention.

A further embodiment discloses an article, e.g. an extrusion article, comprising at least one layer of the low density polyethylene of the invention, or at least one layer of the composition of the invention.

Further, also according to the invention the article may comprise a substrate and at least one extrusion coated layer based on the low density polyethylene of the invention, or the composition of the invention.

As mentioned above the substrate is extrusion coated and thus at least one surface of the substrate is coated. It is however within the scope of the invention that both sides of the substrate, i.e. the outer and inner surface (side) of the substrate are extrusion coated. It is also within the scope of the invention that the layer based on the low density polyethylene of the invention, or based on the composition of the invention, is in directed contact with the substrate or that between the substrate and the layer based on the low density polyethylene of the invention, or based on the composition of the invention, at least one further layer is inserted, like an adhesive layer. Also included are embodiments in which the layer based on the low density polyethylene of the invention, or based on the composition of the invention, has been subjected to ozone treatment or flame treatment and/or the substrate has been subjected to corona treatment, respectively, for improving the adhesion between the layer based on the low density polyethylene of the invention, or based on the composition of the invention, and the substrate.

The layer based on the low density polyethylene of the invention, or based on the composition of the invention, comprised in the extrusion coated substrate has preferably a thickness in the range of 5 to 1000 μm, more preferably in the range of 10 to 100 μm. The specific thickness will be selected according to the nature of the substrate, its expected subsequent handling conditions and, most importantly, the subsequent use of the end product. The thickness of the substrate may generally be chosen freely and has no effect on the coating process. It can typically be from 1 to 1000 μm. e.g. 5 to 300 μm.

The extrusion coating process is preferably carried out using conventional extrusion coating techniques. Hence, the low density polyethylene of the invention, or the composition of the invention, is fed to an extruding device. From the extruder the melt of the low density polyethylene of the invention, or of the composition of the invention, is passed through a flat die to the substrate to be coated. Due to the distance between the die lip and the nip, the molten plastic is oxidized in the air for a short period, usually leading to an improved adhesion between the coating and the substrate. The coated substrate is cooled on a chill roll. Coating layer can be post corona treated to make it suitable for e.g. printing or gluing. Afterwards web edges can be trimmed and web can be wound up. The die width typically depends on the size of the extruder used. Thus, with 90 mm extruders the width may suitably be within the range of 600 to 1200 mm, with 115 mm extruders from 900 to 2500 mm, with 150 mm extruders from 1000 to 4000 mm and with 200 mm extruders from 3000 to 5000 mm. It is also possible to employ a coating line with at least two extruders to make it possible to produce multilayered coatings with different polymers. It is also possible to have arrangements to treat the melt of the low density polyethylene of the invention, or of the composition of the invention, exiting the die to improve adhesion, e.g. by ozone treatment, and the substrate with corona treatment or flame treatment. For the corona treatment, for instance the substrate is passed between two conductor elements serving as electrodes, with such a high voltage, usually an alternating voltage (about 10000 V and 10000 Hz), being applied between the electrodes that spray or corona discharges can occur.

A further embodiment of the invention discloses a method for an extrusion coating process, which method comprises extrusion coating a flat substrate by extruding the low density polyethylene of the invention, or the composition of the invention, in a molten state through a flat die onto said substrate.

With the method for the extrusion coating process which method comprises extruding the low density polyethylene of the invention, it has surprisingly been shown to be possible to utilize a low density polyethylene of a tubular reactor origin in an extrusion coating process and to achieve good neck-in properties which are usually poor for a traditionally produced tubular LDPE. Besides the good neck-in also good web stability, wherein no edge weaving is noticed, at a line speed of 300 m/min and where an even coating weight is obtained.

Edge weaving is defined as having started at the line speed where the edges of the web move 2 mm or more.

An object of the invention is use of a low density polyethylene of the present invention, or use of a composition comprising the low density polyethylene of the present invention, in, for example, extrusion coating, extrusion lamination, film blowing, film casting, wire and cable extrusion, injection moulding, blow moulding or pipe extrusion.

The low density polyethylene of the invention, or the composition of the invention may be used in many applications as for instance in extrusion coating and/or extrusion lamination.

DESCRIPTION OF ANALYTICAL METHODS

Figure 1:
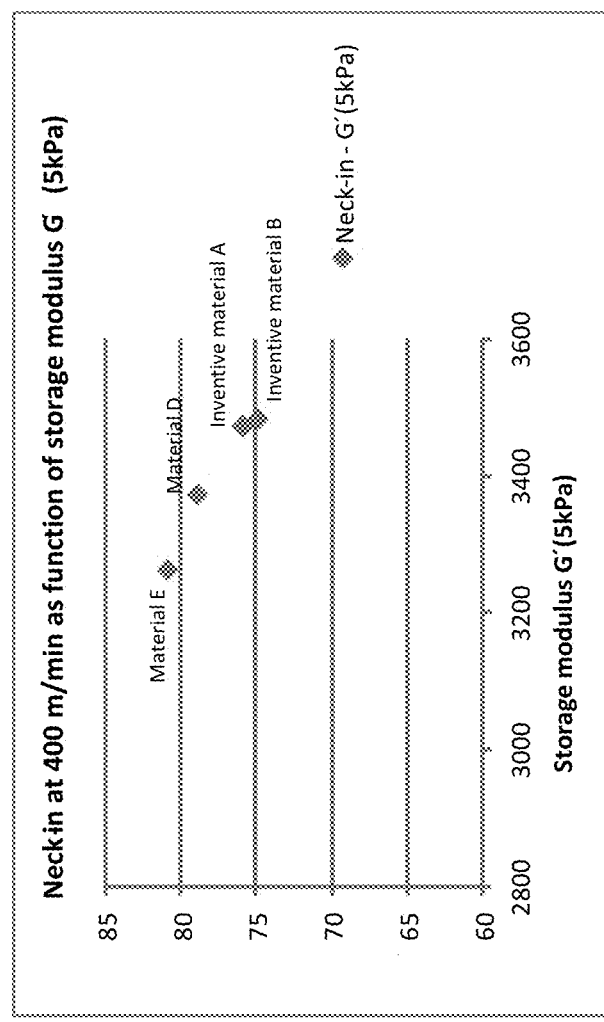
FIG. 1 describes the neck-in of Materials A, B, D and E at 400 m/min as function of storage modulus G', measured at a loss modulus G" of 5 kPa.

Molecular Weights, Molecular Weight Distribution (Mn, Mw, MWD)—GPC

A PL 220 (Agilent) GPC equipped with a refractive index (RI), an online four capillary bridge viscometer (PL-BV 400-HT), and a dual light scattering detector (PL-LS 15/90 light scattering detector) with a 15° and 90° angle was used. 3× Olexis and 1× Olexis Guard columns from Agilent as stationary phase and 1,2,4-trichlorobenzene (TCB, stabilized with 250 mg/L 2,6-Di tert butyl-4-methyl-phenol) as mobile phase at 160° C. and at a constant flow rate of 1 mL/min was applied. 200 μL of sample solution were injected per analysis. All samples were prepared by dissolving 8.0-12.0 mg of polymer in 10 mL (at 160° C.) of stabilized TCB (same as mobile phase) for 2.5 hours for PP or 3 hours for PE at 160° C. under continuous gentle shaking. The injected concentration of the polymer solution at 160° C. ($c_{160° C.}$) was determined in the following way.

$$c_{160°C.} = \frac{w_{25}}{V_{25}} * 0.8772$$

With: $w_{25}$ (polymer weight) and $V_{25}$ (Volume of TCB at 25° C.).

The corresponding detector constants as well as the inter detector delay volumes were determined with a narrow PS standard (MWD=1.01) with a molar mass of 132900 g/mol and a viscosity of 0.4789 dl/g. The corresponding dn/dc for the used PS standard in TCB is 0.053 cm$^3$/g. The calculation was performed using the Cirrus Multi-Offline SEC-Software Version 3.2 (Agilent).

The molar mass at each elution slice was calculated by using the 15° light scattering angle. Data collection, data processing and calculation were performed using the Cirrus Multi SEC-Software Version 3.2. The molecular weight was calculated using the option in the Cirrus software "use LS 15 angle" in the field "sample calculation options subfield slice MW data from". The dn/dc used for the determination of molecular weight was calculated from the detector constant of the RI detector, the concentration c of the sample and the area of the detector response of the analysed sample.

This molecular weight at each slice is calculated in the manner as it is described by by C. Jackson and H. G. Barth (C. Jackson and H. G. Barth, "Molecular Weight Sensitive Detectors" in: Handbook of Size Exclusion Chromatography and related techniques, C. -S. Wu, 2$^{nd}$ ed., Marcel Dekker, New York, 2004, p. 103) at low angle. For the low and high molecular region in which less signal of the LS detector or RI detector respectively was achieved a linear fit was used to correlate the elution volume to the corresponding molecular weight. Depending on the sample the region of the linear fit was adjusted.

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4: 2003 and ASTM D 6474-99 using the following formulas:

$$M_n = \frac{\sum_{i=1}^{N} A_i}{\sum (A_i/M_i)} \quad (1)$$

$$M_w = \frac{\sum_{i=1}^{N} (A_i \times M_i)}{\sum A_i} \quad (2)$$

$$M_z = \frac{\sum_{i=1}^{N} (A_i \times M_i^2)}{\sum (A_i/M_i)} \quad (3)$$

For a constant elution volume interval $\Delta V_i$, where $A_i$ and $M_i$ are the chromatographic peak slice area and polyolefin molecular weight (MW) determined by GPC-LS.

Melt Flow Rate

Melt flow rate of the low density polyethylene was determined according to ISO 1133 at 190° C. under a load of 2.16 kg (MFR). The melt flow rate is that quantity of polymer in grams which the test apparatus standardised to ISO 1133 extrudes within 10 minutes at a temperature of 190° C. under a load of 2.16 kg.

Storage Modulus (G')

Dynamic Shear Measurements (Frequency Sweep Measurements)

The characterisation of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates, using nitrogen atmosphere and setting a strain within the linear viscoelastic regime. The oscillatory shear tests were done at 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \quad (1)$$

If the applied strain is within the linear viscoelastic regime, the resulting sinusoidal stress response can be given by $$\sigma(t) = \sigma_0 \sin(\omega t + \delta) \quad (2)$$

where $\sigma_0$ and $\gamma_0$ are the stress and strain amplitudes, respectively
$\omega$ is the angular frequency
$\delta$ is the phase shift (loss angle between applied strain and stress response)
t is the time Dynamic test results are typically expressed by means of several different rheological functions, namely the shear storage modulus G', the shear loss modulus, G", the complex shear modulus, G*, the complex shear viscosity, η*, the dynamic shear viscosity, η', the out-of-phase component of the complex shear viscosity η" and the loss tangent, tan δ which can be expressed as follows:

$$G' = \frac{\sigma_0}{\gamma_0} \cos\delta \; [Pa] \quad (3)$$

$$G'' = \frac{\sigma_0}{\gamma_0} \sin\delta \; [Pa] \quad (4)$$

$$G^* = G' + iG'' \; [Pa] \quad (5)$$

$$\eta^* = \eta' - i\eta'' \; [Pa \cdot s] \quad (6)$$

-continued $$\eta' = \frac{G''}{\omega} \ [Pa \cdot s] \quad (7)$$

$$\eta'' = \frac{G'}{\omega} \ [Pa \cdot s] \quad (8)$$

Besides the above mentioned rheological functions one can also determine other rheological parameters such as the so-called elasticity index EI(x). The elasticity index EI(x) is the value of the storage modulus, G' determined for a value of the loss modulus, G" of x kPa and can be described by equation (9).

$$EI(x)=G' \text{ for } (G''=x \text{ kPa}) \text{ [Pa]} \quad (9)$$

For example, the EI(5 kPa) is the defined by the value of the storage modulus G', determined for a value of G" equal to 5 kPa.

References

[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol., 11th (1992), 1, 360-362

[2] The influence of molecular structure on some rheological properties of polyethylene", Heino, E. L., Borealis Polymers Oy, Porvoo, Finland, Annual Transactions of the Nordic Rheology Society, 1995.).

[3] Definition of terms relating to the non-ultimate mechanical properties of polymers, Pure & Appl. Chem., Vol. 70, No. 3, pp. 701-754, 1998.

Quantification of Microstructure by NMR Spectroscopy

Quantitative nuclear-magnetic resonance (NMR) spectroscopy was used to quantify the content of unsaturated groups present in the polymers.

Quantitative $^1$H NMR spectra recorded in the solution-state using a Bruker Advance III 400 NMR spectrometer operating at 400.15 MHz. All spectra were recorded using a $^{13}$C optimised 10 mm selective excitation probehead at 125° C. using nitrogen gas for all pneumatics. Approximately 200 mg of material was dissolved in 1,2-tetrachloroethane-d$_2$ (TCE-d$_2$) using approximately 3 mg of Hostanox O3 (CAS 32509-66-3) as stabiliser. Standard single-pulse excitation was employed utilising a 30 degree pulse, a relaxation delay of 10 s and 10 Hz sample rotation. A total of 128 transients were acquired per spectra using 4 dummy scans. This setup was chosen primarily for the high resolution needed for unsaturation quantification and stability of the vinylidene groups. {he10a, busico05a} All chemical shifts were internally to the signal resulting from the residual protonated solvent at 5.95 ppm.

Characteristic signals corresponding to the presence of terminal vinyl groups (R—CH=CH$_2$) were observed and the amount of vinylidene groups quantified using the integral of the coupled terminal Va and Vb protons at 4.95, 4.98 and 5.00 and 5.05 ppm respectively accounting for the number of reporting sites per functional group:

$N$vinyl=$(IVa+IVb)/2$

The content of vinyl groups was calculated as the fraction of vinyl group in the polymer with respect to the total number of carbons present:

$U$vinyl=$N$vinyl/$C$total

Characteristic signals corresponding to the presence of internal vinylidene groups (RR'C=CH$_2$) were observed and the amount of vinylidene groups quantified using the integral of the two D terminal protons at 4.74 ppm accounting for the number of reporting sites per functional group:

$N$vinylidene=$ID/2$

The content of vinylidene groups was calculated as the fraction of vinylidine group in the polymer with respect to the total number of carbons present:

$U$vinylidene=$N$vinylidene/$C$total

Characteristic signals corresponding to the presence of internal cis-vinylene groups (E-RCH=CHR') were observed and the amount of cis-vinylene groups quantified using the integral of the two C protons at 5.39 ppm accounting for the number of reporting sites per functional group:

$N$cis=$IC/2$

The content of cis-vinylene groups was calculated as the fraction of cis-vinlylene group in the polymer with respect to the total number of carbons present:

$U$cis=$N$cis/$C$total

Characteristic signals corresponding to the presence of internal trans-vinylene groups (Z—RCH=CHR') were observed and the amount of trans-vinylene groups quantified using the integral of the two T protons at 5.45 ppm accounting for the number of reporting sites per functional group:

$N$trans=$IT/2$

The content of trans-vinylene groups was calculated as the fraction of trans-vinlylene group in the polymer with respect to the total number of carbons present:

$U$trans=$N$trans/$C$total

The total amount of carbon was calculated from the bulk aliphatic integral between 2.85 and −1.00 accounting for the number of reporting nuclei and compensation for sites relating to unsaturation not including in this region:

$C$total=$(1/2)*(I$aliphatic+$N$vinyl+$N$vinylidene+$N$cis+$N$trans)

The total amount of unsaturated group was calculated as the sum of the individual observed unsaturated groups and thus also reported with respect to the total number of carbons present:

$U$total=$U$vinyl+$U$vinylidene+$U$cis+$U$trans

The unsaturation content is given as amount of unsaturated group/100 kC where 100 kC means 100000 carbons.

The relative content of a specific unsaturated group (x) is reported as the fraction or percentage of a given unsaturated group with respect to the total amount of unsaturated groups:

$[Ux]=Ux/U$total

REFERENCES he10a

He, Y., Qiu, X, and Zhou, Z., Mag. Res. Chem. 2010, 48, 537-542.

busico05a

Busico, V. et. al. Macromolecules, 2005, 38 (16), 6988-6996

EXAMPLES

Low density polyethylene was produced by radical polymerization in a three zone, front-feed tubular reactor. Chain transfer agent used was propylene and propionic aldehyde. The pressure in the reactor was between 200-250 MPa and the peak temperatures were in the range of 250 to 320° C.

The initiator mixture used in all the experiments was composed of the following radical initiators (The 0.1 hours half life temperature (T½) given for each radical initiator). The initiators were dissolved in isododecane. Content of each initiator in each zone is given in Table 1.

Initiator A (T½ 0.1 h at 75-90° C. in chlorobenzene),
Initiator B (T½ 0.1 h at 80-95° C. in chlorobenzene),
Initiator C (T½ 0.1 h at 105-125° C. in chlorobenzene),
Initiator D (T½ 0.1 h at 125-140° C. in chlorobenzene)
Initiator E (T½ 0.1 h at 130-145° C. in chlorobenzene) and
Initator F (T½ 0.1 h at 155-175° C. in chlorobenzene).

TABLE 1

| Initiator | Zone 1 (wt-%) | Zone 2 (wt-%) | Zone 3 (wt-%) |
|---|---|---|---|
| A | 4-6 | 0-1 | 0-1 |
| B | 4-6 | 0-1 | 0-1 |
| C | 5-7 | 3-5 | 20-40 |
| D | 1-3 | 5-7 | 0-2 |
| E | 3-5 | 5-7 | 0-2 |
| F | 2-4 | 4-6 | 0-2 |

Material A
Innovative Example

The inlet temperature of the reaction mixture into the first reaction zone (reaction zone 1) was 133° C. About 27 000 kg/h of the reaction mixture was fed to the front of the reactor into the first reaction zone of the reactor. Initiator mixture was fed to all three reaction zones in such amounts that the peak temperatures in Table 2 were reached. The polymerization yielded about 9193 kg polymer/h.

TABLE 2

| Reaction zone | Peak temperature (° C.) |
|---|---|
| 1 | 316 |
| 2 | 308 |
| 3 | 265 |

The chain transfer agent was added in such amounts that the polymer formed, i.e. the low density polyethylene of the present invention, had a melt flow rate of about 5.7 g/10 min according to ISO 1133 (190° C., 2.16 kg).

The density of the polymer produced, i.e. the low density polyethylene of the present invention, was about 918 kg/m$^3$ according to ISO 1183.

The weight average molecular weight (Mw) of the polymer produced, i.e. the low density polyethylene of the present invention, was 203000 g/mol.

The molecular weight distribution (MWD) of the polymer produced, i.e. the low density polyethylene of the present invention, was 14.5.

Material B
Innovative Example

The inlet temperature of the reaction mixture into the first reaction zone (reaction zone 1) was 130° C. About 27 000 kg/h of the reaction mixture, was fed to the front of the reactor into the first reaction zone of the reactor. Initiator mixture was fed to all three reaction zones in such amounts that the peak temperatures in Table 3 were reached. The polymerization yielded about 9320 kg polymer/h.

TABLE 3

| Reaction zone | Peak temperature |
|---|---|
| 1 | 316 |
| 2 | 307 |
| 3 | 268 |

The chain transfer agent was added in such amounts that the polymer formed, i.e. the low density polyethylene of the present invention, had a melt flow rate of about 5.3 g/10 min according to ISO 1133 (190° C., 2.16 kg).

The density of the polymer produced, i.e. the low density polyethylene of the present invention, was about 918 kg/m$^3$ according to ISO 1183.

The weight average molecular weight (Mw) of the polymer produced, i.e. the low density polyethylene of the present invention, was 237000 g/mol.

The molecular weight distribution (MWD) of the polymer produced, i.e. the low density polyethylene of the present invention, was 14.8.

Material C
Comparative Example

The inlet temperature of the reaction mixture into the first reaction zone (reaction zone 1) was 135° C. About 27 000 kg/h of the reaction mixture, was fed to the front of the reactor into the first reaction zone of the reactor. Initiator mixture was fed to all three reaction zones in such amounts that the peak temperatures in Table 4 were reached. The polymerization yielded about 9220 kg polymer/h.

TABLE 4

| Reaction zone | Peak temperature |
|---|---|
| 1 | 308 |
| 2 | 310 |
| 3 | 260 |

The chain transfer agent was added in such amounts that the polymer formed had a melt flow rate of about 3.0 g/10 min according to ISO 1133 (190° C., 2.16 kg).

The density of the polymer produced was about 918 kg/m$^3$ according to ISO 1183.

The weight average molecular weight Mw was 180000 g/mol.

The molecular weight distribution (MWD) was 21.1.

Material D
Comparative Example

The inlet temperature of the reaction mixture into the first reaction zone (reaction zone 1) was 135° C. About 27 000 kg/h of the reaction mixture, was fed to the front of the reactor into the first reaction zone of the reactor. Initiator mixture was fed to all three reaction zones in such amounts that the peak temperatures in Table 5 were reached. The polymerization yielded about 9210 kg polymer/h.

TABLE 5

| Reaction zone | Peak temperature |
|---|---|
| 1 | 307 |
| 2 | 311 |
| 3 | 258 |

The chain transfer agent was added in such amounts that the polymer formed had a melt flow rate of about 4.0 g/10 min according to ISO 1133 (190° C., 2.16 kg).

The density of the polymer produced was about 918 kg/m³ according to ISO 1183.

The weight average molecular weight Mw was 170000 g/mol.

The molecular weight distribution (MWD) was 19.4.

Material E

Comparative Example

The inlet temperature of the reaction mixture into the first reaction zone (reaction zone 1) was 135° C. About 27 000 kg/h of ethylene, i.e. the reaction mixture, was fed to the front of the reactor, i.e. into the first reaction zone of the reactor. Initiator mixture was fed to all three reaction zones in such amounts that the peak temperatures in Table 6 were reached. The polymerization yielded about 9180 kg polymer/h.

TABLE 6

| Reaction zone | Peak temperature |
| --- | --- |
| 1 | 307 |
| 2 | 311 |
| 3 | 258 |

The chain transfer agent was added in such amounts that the polymer formed had a melt flow rate of about 4.0 g/10 min according to ISO 1133 (190° C., 2.16 kg).

The density of the polymer produced was about 918 kg/m³ according to ISO 1183.

The weight average molecular weight Mw was 167000 g/mol.

The molecular weight distribution (MWD) was 22.6.

The storage modulus G', measured at a loss modulus G" of 5 kPa, of the low density polyethylene of the present invention, i.e. Material A and B, is higher than the comparative examples, e.g. Material D to E, produced with higher inlet temperatures. From the examples, see Table 7 and FIG. 1, it is also clear that neck-in is reduced by increased G' (5 kPa). When increasing the G'5 (kPa) by just lowering MFR (Material C) the processing properties (Edge weaving) becomes so poor that it is impossible to run at 400 m/min (Table 7)

Figure 2:
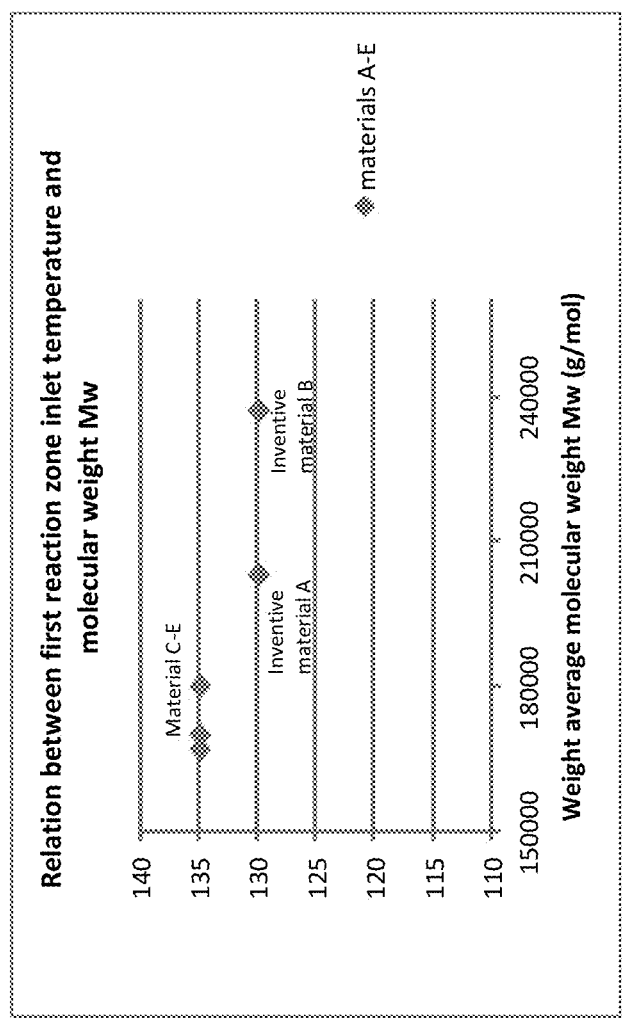
FIG. 2 describes the relation between first reaction zone inlet temperature and molecular weight Mw.
Figure 3:
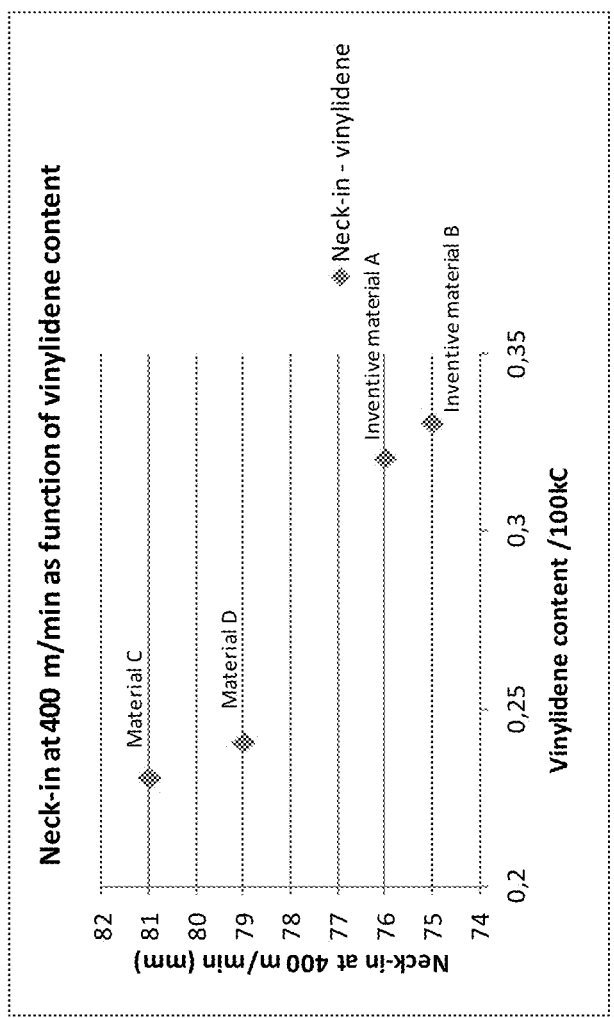
FIG. 3 describes neck-in of Material A to D at 400 m/min as function of vinylidene content.
Figure 4:
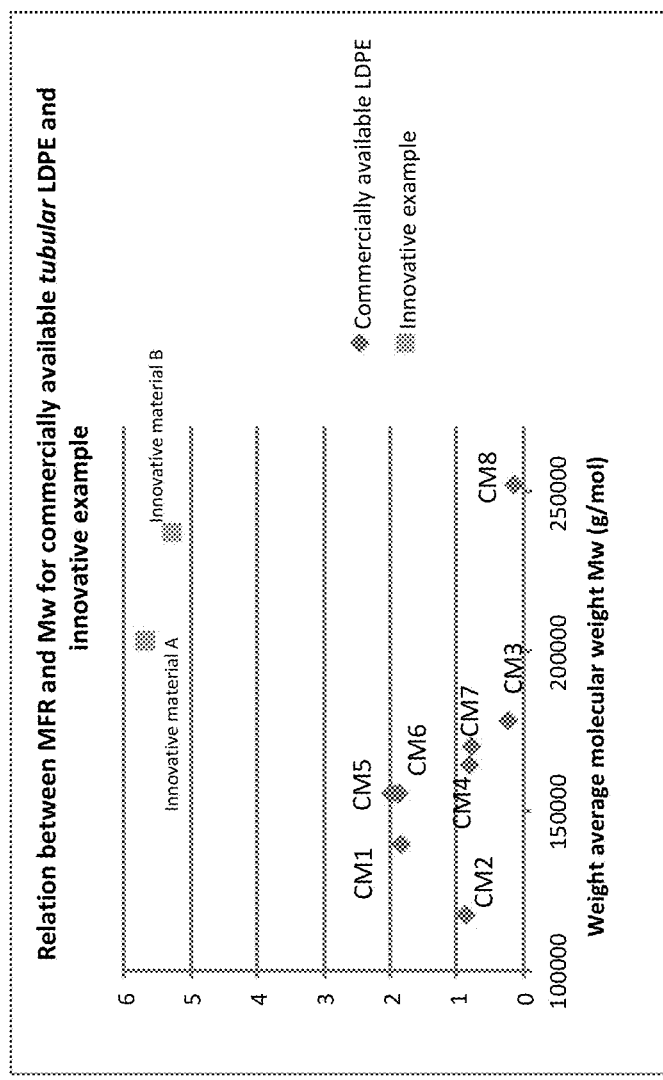
FIG. 4 describes relation between MFR and Mw for commercially available tubular LDPE and innovative examples

FIG. 2 shows the importance of a low inlet temperature into the first reaction zone of the reactor to get a high weight average molecular weight (Mw) and hence a low neck-in. The importance of the combination of high Mw and high MFR is showed in Table 7 where the low MFR material C is not possible to run at high line speeds. Table 8 and FIG. 4 show the innovative example Material A and B compared to commercially available LDPE regarding MFR and Mw.

In table 7 and FIG. 2 the improvement in neck-in properties when having a higher Mw is clear. Also from example C it is clear that reaching a high Mw by reducing MFR gives poor processing properties where the material cannot be run at high line speeds.

As seen in FIG. 1 the elasticity index is important for improving neck-in, but as for Mw, reducing MFR to increase elasticity index do not give the desired processing properties.

TABLE 7

| Material | Elasticity index G' (5 kPa) | Zone 1 inlet temperature (° C.) | MFR (2.16 kg/10 min) | Mw (g/mol) | MWD | Vinylidene content/ 100 kC | Neck-in at 400 m/min (mm) |
| --- | --- | --- | --- | --- | --- | --- | --- |
| A | 3480 | 133 | 5.7 | 203000 | 14.5 | 32 | 76 |
| B | 3470 | 134 | 5.3 | 237000 | 14.8 | 33 | 75 |
| C | 3530 | 135 | 3.0 | 180000 | 21.1 | — | Not possible to run at 400 m/min |
| D | 3370 | 135 | 4.0 | 170000 | 19.4 | 24 | 79 |
| E | 3260 | 135 | 4.0 | 167000 | 22.6 | 23 | 81 |

Examples Extrusion Coating

Trial

Extrusion coating runs were made on Beloit coextrusion coating line. It had Peter Cloeren's EBR die and a five layer feed block. The width of the line die opening was 850-1000 mm, maximum width of the substrate is 800 mm and the line speed was maintained at 100 m/min.

The extrusion coating behaviour of the polymer compositions, i.e. Materials A, B, C, D and E, were analysed.

In the coating line above UG Kraft paper having a basis weight of 70 g/m² was coated with a layer of a polymer composition according to the present invention having a basis weight of 10 g/m². The temperature of the polymer composition melt, i.e. melt of Material A, B, C, D or E, was set to 320° C.

Draw-down testing of the materials, i.e. Materials A, B, C, D and E, were performed by increasing the line speed stepwise until web instability occurred. Coating weight (amount of polymer on substrate in g/m²) was kept at 10 g/m². Web instability was monitored visually through the amount of edge weaving. Samples were marked into the coated web at 100 m/min intervals, starting at 100 m/min until web instability occurred. Samples were taken out from the reel and neck-in and coating weight were measured afterwards. Neck-in is defined as the difference in width of the die opening and width of the coating on the substrate. Coating weight was measured from 5 positions across the web.

The invention claimed is:

1. A low density polyethylene having a molecular weight distribution Mw/Mn that is from 11 to 15, a storage modulus G', measured at a loss modulus G" of 5 kPa, which is above 3000 Pa, a weight average molecular weight (Mw) which is between 192000 and 250000 g/mol, and a melt flow rate (MFR) according to ISO 1133 (190° C., 2.16 kg) which is higher than 3.0 g/10 min.

2. A low density polyethylene according to claim 1, wherein the low density polyethylene is produced in a tubular reactor.

3. A low density polyethylene according to claim 1, wherein the low density polyethylene has a vinylidene content which is at least 15/100 k C.

4. A composition comprising the low density polyethylene according to claim 1, wherein the composition is useful in extrusion coating and/or extrusion lamination processes.

5. A composition according to claim 4, comprising the low density polyethylene in an amount of 5 to 40 wt %, based on the total weight of the composition, and further comprising at least one olefin polymer prepared in the presence of a transition metal catalyst, which at least one olefin polymer is selected from homo- or copolymers of polyethylene, polypropylene or poly-1-butene.

6. A method for an extrusion coating process, which method comprises extrusion coating a flat substrate by extruding the composition according to claim 4, in a molten state through a flat die onto said substrate.

7. A method for an extrusion lamination process utilizing the composition according to claim 4.

8. A process for production of the low density polyethylene according to claim 1, in a tubular reactor by radical initiated polymerization under high pressure where the polymerization is performed by reacting a reaction mixture, comprising ethylene monomers, under the action of one or more radical initiators, being a peroxide, oxygen or combinations thereof, characterized by that the inlet temperature of the reaction mixture into the first reaction zone of the reactor is from 125 to 132° C.

9. A process according to claim 8, wherein a radical initiator cocktail is used, which is composed of the following radical initiators, where the 0.1 hours half life temperature (T½) is given for each radical initiator: Initiator A (T½ 0.1 h at 75-90° C. in chlorobenzene), Initiator B (T½ 0.1 h at 80-95° C. in chlorobenzene), Initiator C (T½ 0.1 h at 105-125° C. in chlorobenzene), Initiator D (T½ 0.1 h at 125-140° C. in chlorobenzene) Initiator E (T½ 0.1 h at 130-145° C. in chlorobenzene) and Initator F (T½ 0.1 h at 155-175° C. in chlorobenzene).

10. A low density polyethylene which is obtained by the process according to claim 9.

11. A method for an extrusion coating process, which method comprises extrusion coating a flat substrate by extruding the low density polyethylene according to claim 1.

12. A method for an extrusion lamination process utilizing the low density polyethylene according to claim 1.

13. An article selected from an extrusion article, an extrusion coating article or an extrusion lamination article, film blowing article, film casting article, wire and cable extrusion article, injection molding article, blow molding article or pipe extrusion article, comprising the low density polyethylene according to claim 1.

* * * * *